July 30, 1963 J. B. REID ETAL 3,099,026
METHOD FOR APPLYING ADHESIVE MATERIALS TO AN INSOLE
Filed Feb. 21, 1962 8 Sheets-Sheet 1

INVENTORS
ROBERT A. SPENCE
JOHN B. REID
BY Browne, Schuyler & Beveridge
ATTORNEYS July 30, 1963  J. B. REID ETAL  3,099,026
METHOD FOR APPLYING ADHESIVE MATERIALS TO AN INSOLE
Filed Feb. 21, 1962   8 Sheets-Sheet 2
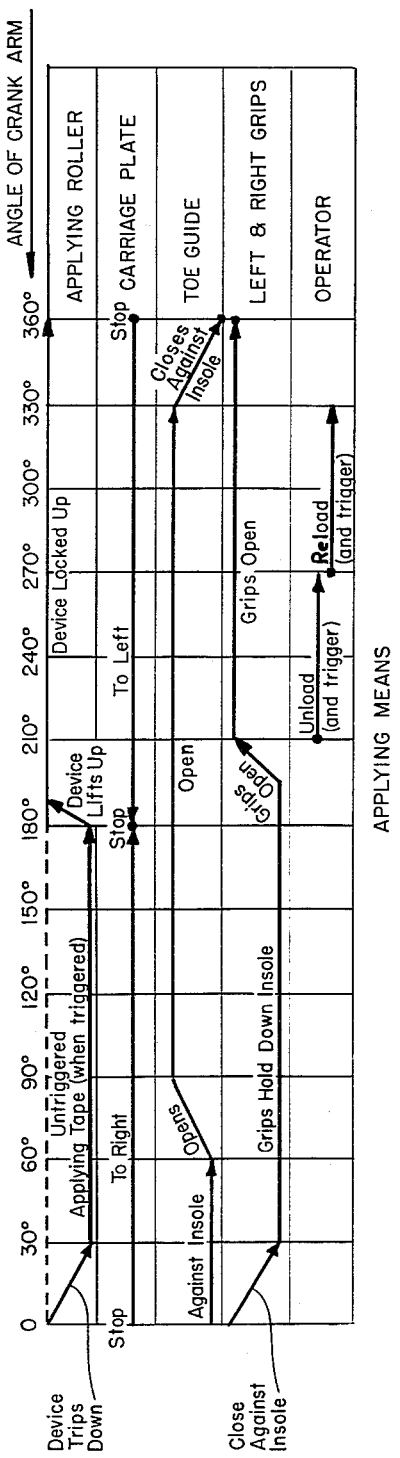
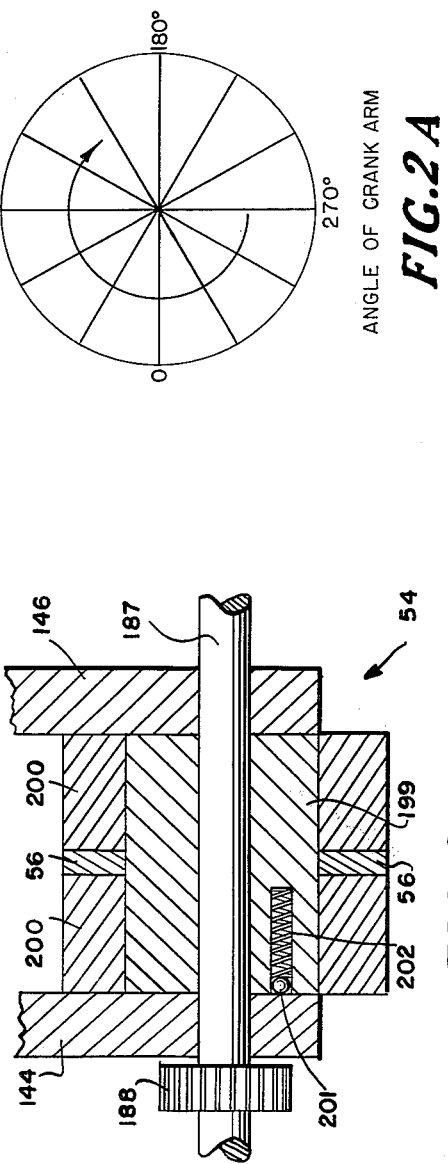
INVENTORS
ROBERT A. SPENCE
JOHN B. REID
BY
Browne, Schuyler & Beveridge
ATTORNEYS

INVENTORS
ROBERT A. SPENCE
JOHN B. REID

INVENTORS
ROBERT A. SPENCE
JOHN B. REID

July 30, 1963  J. B. REID ETAL  3,099,026
METHOD FOR APPLYING ADHESIVE MATERIALS TO AN INSOLE
Filed Feb. 21, 1962  8 Sheets-Sheet 5

INVENTORS
ROBERT A. SPENCE
JOHN B. REID
BY Browne, Schuyler & Beveridge
ATTORNEYS

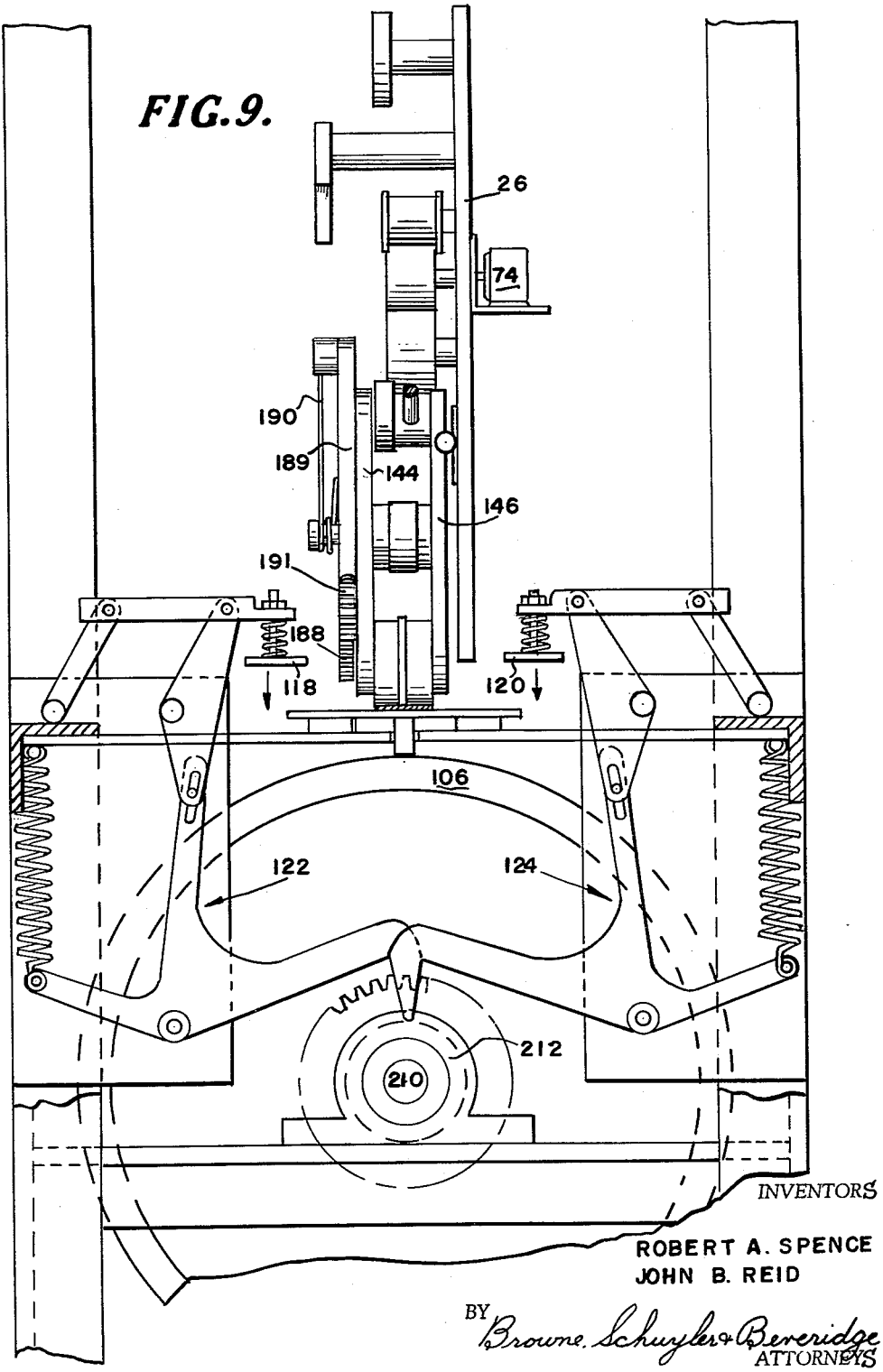

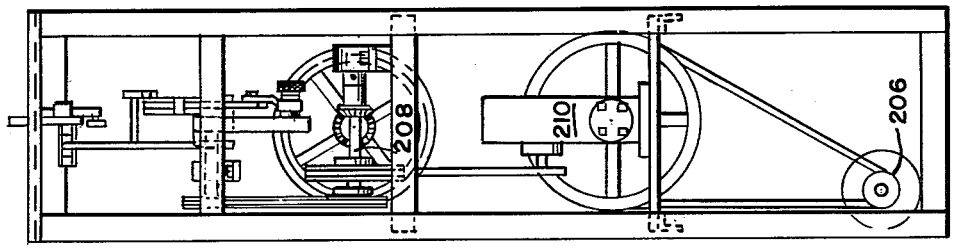
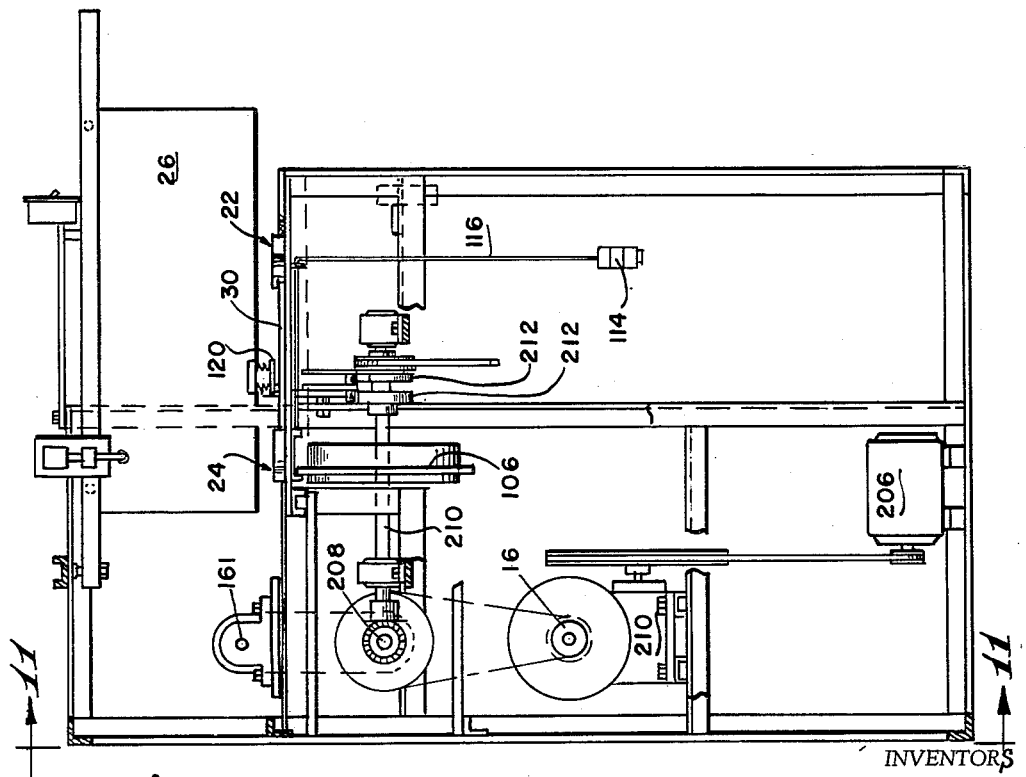

3,099,026
METHOD FOR APPLYING ADHESIVE
MATERIALS TO AN INSOLE
John B. Reid, Brighton, and Robert A. Spence, South
Lincoln, Mass., assignors to Bain Corporation, Cambridge, Mass., a corporation of Massachusetts
Filed Feb. 21, 1962, Ser. No. 174,841
8 Claims. (Cl. 12—142)

The present invention generally relates to the manufacturing of footwear, and more particularly to a novel method for applying adhesive material to a shoe insole as a part of the manufacturing operation, more fully described in our copending application Serial No. 150,037, filed November 3, 1961, Patent No. 3,052,904, granted September 11, 1962, the disclosure of which is incoporated herein by reference.

In the past, insoles have customarily been secured to the bottom of a mating last by means of suitable tack fasteners driven directly through the insole into the last in order to temporarily secure the same in assembled alignment until completion of the lasting operation. The desirability of replacing the customary tack fastener with some other means to temporarily secure the insole to the bottom of a mating last has long been recognized by the industry. For example, the insole can be directly bonded to the last bottom by a thermoplastic adhesive material which may be subsequently released through the application of either heat or vibrational shock. Regardless of the means employed, the insole must be firmly retained in aligned position on the last so as to withstand the severe lateral and normal stresses imposed during the lasting operation that tend to displace the insole relative to the last. At the same time, the temporary bond between the last and insole must be such that upon completion of the lasting operation, it may be easily broken so as to completely release the last for removal from the interior of the completed shoe. Accordingly, this application is a further improvement pertaining to the subject matter disclosed in our copending application Serial No. 150,037, filed November 3, 1961, now Patent No. 3,052,904, which generally relates to a novel method for detachably securing an insole to the bottom of a mating last with double-faced, pressure-sensitive adhesive material, preferably in tape form, which serves to prevent displacement of the assembled components during the lasting operation while facilitating instantaneous release of the adhesive bond when subjected to a separating force, in the manner more fully described in said patent.

Therefore, the primary purpose of this invention is the automatic application of adhesive material, preferably in tape form, to an insole regardless of its contoured outline, as a step in the manufacturing procedure.

The principal object of the present invention relates to a novel method for selectively controlling and varying the length as well as relative position of the tape being applied to an insole.

A further object of this invention relates to a method for positioning an insole, regardless of its contoured outline to receive adhesive material within an area common to right and left paired insoles.

A still further object of the present invention relates to a novel method for transferring double-faced, pressure-sensitive tape material from one surface of contact to another by developing differential adhesive bonds of varying magnitude.

Another object of the invention is to separately remove any interliner that may be interposed between adjacent adhesive surfaces of a roll of double-faced, pressure-sensitive adhesive tape by sensing said interliner relative to the peripheral surface of the angular displacement of the tape roll.

An additional object of the present invention relates to a novel method for automatically positioning and intermittently applying tape of preselected length and varied widths within an area of an insole defined by the common outline formed by an opposed image of said insole superimposed thereon, regardless of its contoured outline, and thereafter sever the tape transferred to the insole, while separately stripping an interliner from the tape roll on demand of the taping operation.

Other objects and the entire scope of the present invention will become apparent from the following detailed description and by reference to the accompanying drawings. It should be understood, however, that the detailed description and specific examples, while indicating preferred embodiments of the invention, are given by way of illustration only, since various changes and modifications within the spirit and scope of the invention will become apparent as the description herein progresses. Reference now being made to the accompanying drawings which form a part hereof, wherein like numerals refer to similar parts throughout, and in which:

FIGURE 2 is a schematic illustration of the apparatus operating cycle.

FIGURE 2(a) is a schematic illustration showing the relative angle of the crank arm during the operating cycle referred to in FIGURE 2.

FIGURE 6(b) is an enlarged cross-sectional view of a tape applying roller employed in the present invention.

FIGURE 9 is a transverse elevational view, with parts removed, of the tape applying apparatus and schematic illustration showing actuation of the related insole holddown assembly.

FIGURE 10 is a longitudinal sectional view, with parts removed, of the tape applying apparatus.

FIGURE 11 is a transverse sectional view of the tape applying apparatus, with parts removed, taken along lines 11—11 of FIGURE 10.

*General Operation*

Figure 1:
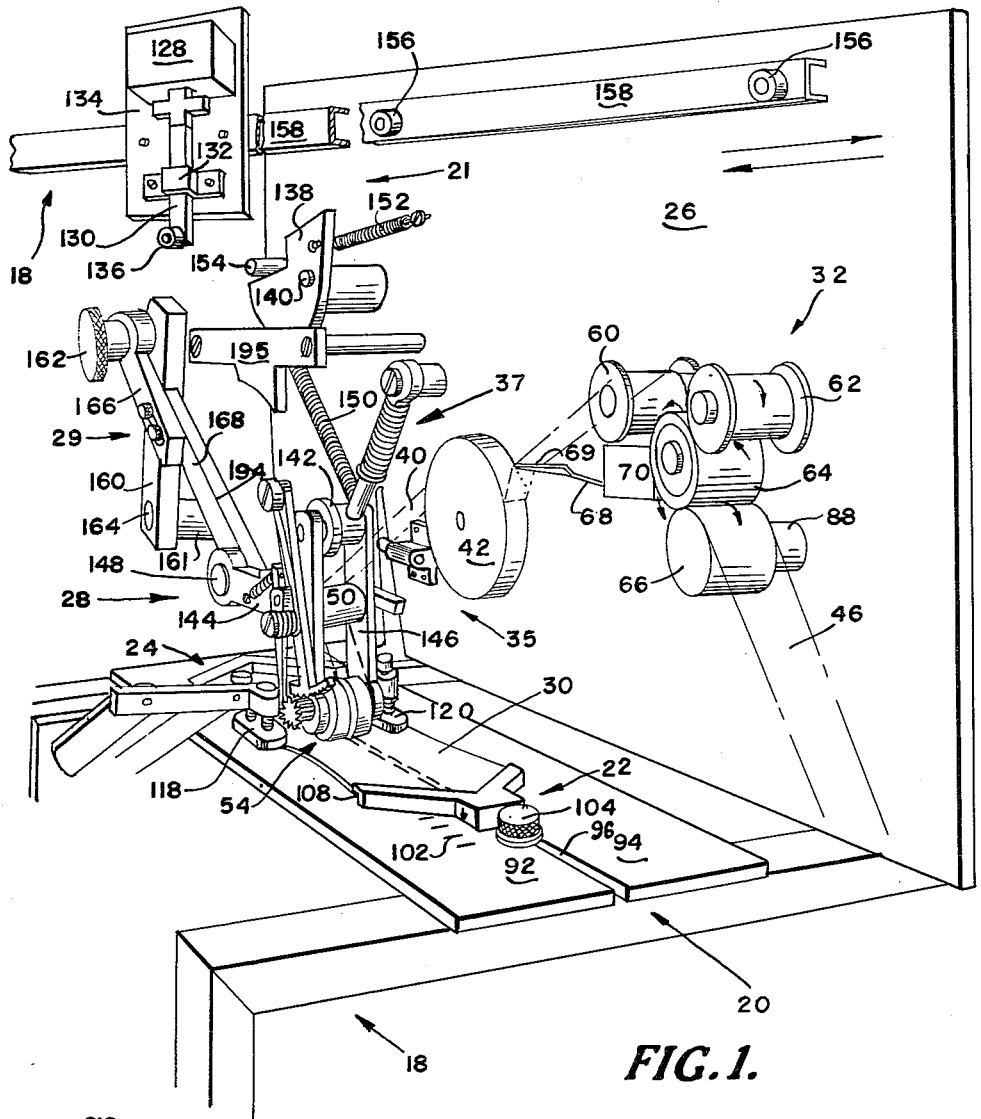
FIGURE 1 is a perspective view of a tape applying apparatus which forms the subject matter of the present invention.

Referring now more specifically to the apparatus illustrated in the accompanying drawings, the machine shown in FIGURE 1 generally comprises a longitudinally slotted table or deck portion 20 with slideably mounted alignment guides 22 and 24 for positioning an insole 30 located below a movable carriage assembly 26 that holds the tape applying assembly 28 and liner take-up mechanisms 32.

Figure 3:
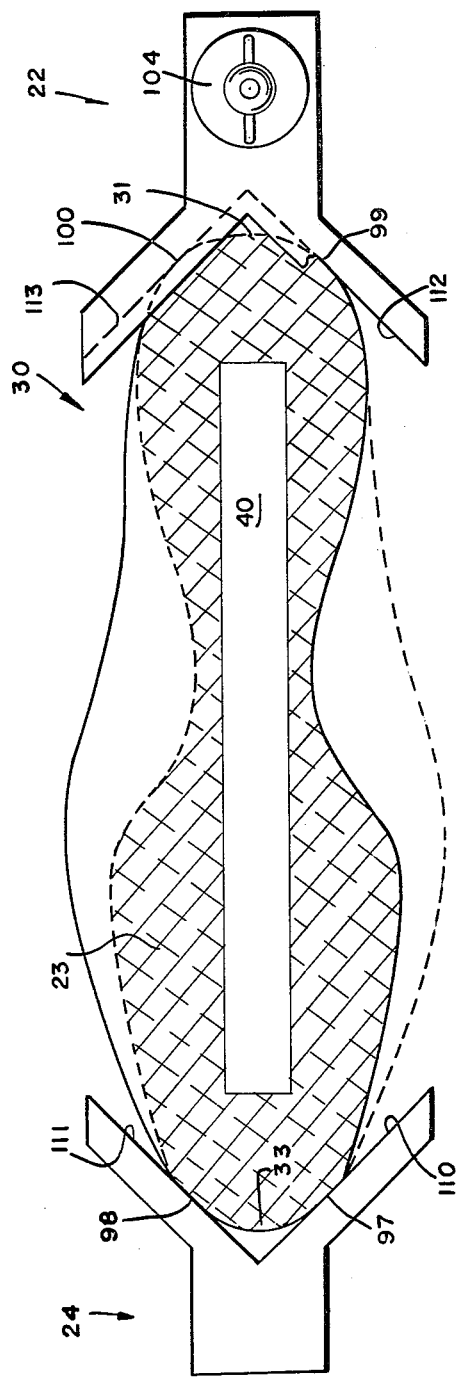
FIGURE 3 is a schematic plan view of a right insole with an opposed image thereof superimposed thereon to define a common area outlined in phantom for receiving adhesive material.

In operation, double-faced, pressure-sensitive adhesive tape 40 is directly applied to an insole 30 by the tape applying assembly 28 after it has moved from a remote raised position downwardly toward the insole upon actuation of the trigger assembly 21. After the applying assembly 28 contacts the insole 30, it is moved forward longitudinally over the deck 20 a preselected distance transferring the tape 40 directly to the insole 30 within a common specified area 23, as illustrated in FIGURE 3. After the tape has been transferred, applying assembly 28 is raised, actuating the cutting mechanism 25 (FIGURE 7) to sever the tape. As the applying assembly is returned to remote position, the cutting mechanism 25 is then recocked. While tape is being fed to the applying assembly 28, the interliner 46 is automatically stripped upon demand by the liner take-up assembly 32.

Tape Loading

A roll of tape 42, or a magazine combination of more than one roll, is loaded by the operator on the tape roll wheel 44. Double-faced, pressure-sensitive tape is employed, preferably of the type described in our Patent No. 3,052,904, referred to above.

Figure 6:
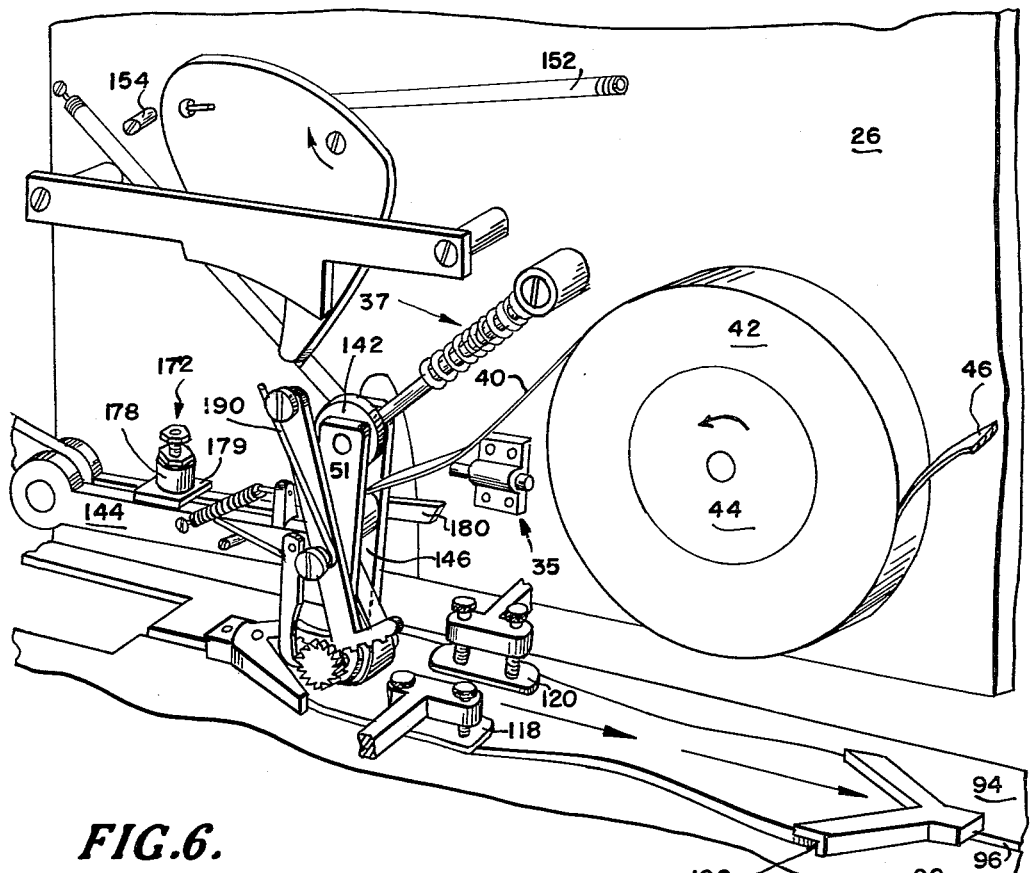
FIGURE 6 is a perspective view of the tape applying assembly shown in initial tape applying position.
Figure 6A:
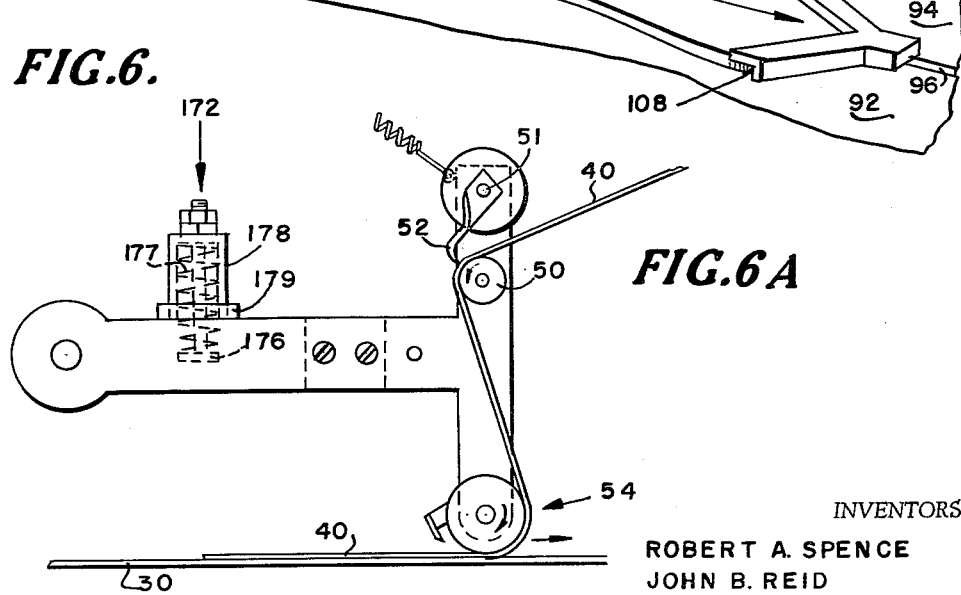
FIGURE 6(a) is a sectional view, with parts removed, of a tape applying roller assembly illustrating the path of tape movement during transfer to an insole.

A portion of the parting medium, or interliner 46 separating the adjacent adhesive surfaces of the tape 40 is stripped off from the roll and the exposed tape is threaded counterclockwise over the tape lock roller 50 and between the tape lock roller and the tape lock pawl 52, as shown in FIGURES 6 and 6(a). The tape is then threaded clockwise around the outside periphery of the applying roller 54, terminating under the bottom center of the applying roller and is lightly pressed to the center disk 56 (FIGURE 6(b)) so that the terminal end of the tape 40 will lightly adhere to the center disk of the applying roller.

Liner Take-Up

Figure 4:
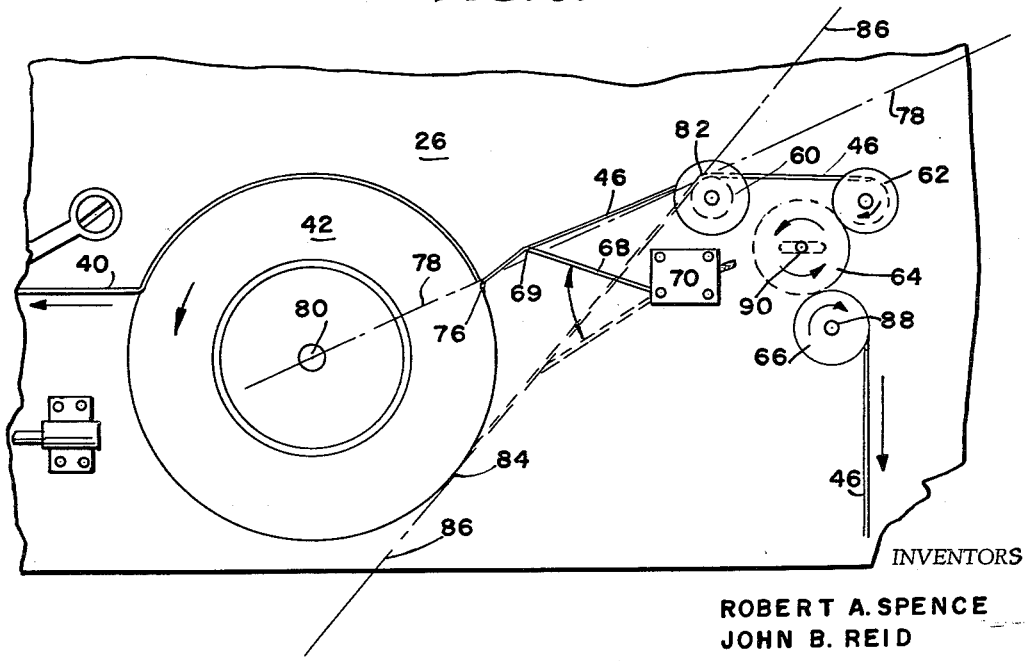
FIGURE 4 is an elevational view of a liner take-up assembly schematically illustrating the sensing range through which an interliner passes while being stripped from a roll of tape.

The interliner or parting medium 46 stripped off the tape roll 42 is led upwardly over the liner take-up spools or guides 60 and 62, as shown in FIGURES 1 and 4. The liner is threaded clockwise around spool 62 and fed counterclockwise around the liner take-up jam roll 64 and then clockwise around the liner take-up power roll 66. The liner take-up switch arm 68, extending from microswitch 70 adjustably mounted on the carriage assembly 26, is positioned to bear against the liner 46 with its leading edge 69. The electrical motor actuating switch 72, illustrated schematically in FIGURE 12, for controlling power to the liner take-up power roll motor 74, is then switched to the "on" position. This completes the tape loading phase. The uppermost point of separation 76 of the liner 46 from the outer periphery of roll 42 as the liner moves upwardly, must not be above a line 78 extending between the central axis 80 of roll 42 and the point 82 at which the liner 46 meets the upper periphery of spool 60, otherwise the roll 42 may be caused to move in a reverse clockwise direction.

The lowermost point 84 of separation between the liner 46 and the outer periphery of roll 42 must not be below a line 86 extending tangentially between the lower outer periphery of roll 42 and the point 82. The responsive range of sensitivity lies between the uppermost and lowermost points 76 and 84, respectively, wherein the liner microswitch arm 68 can operate between "on" and "off" positions on demand. During operation, while tape is being removed from the tape roll 42, which rotates counterclockwise, microswitch 70 will switch to the "on" position as the liner 46 rises upwardly during its travel between the tape roll and the forward liner spool or guide 60. As the position of the liner changes angularly relative to the outer periphery of the tape roll in its movement between the lowermost and uppermost points of separation, the liner microswitch arm 68, which is spring biased upwardly and bears directly against a face of the liner, will actuate the microswitch between "off" and "on" positions. The microswitch is electrically connected to the liner take-up power roll motor 74 which drives shaft 88 carrying power roll 66. Motor 74 is suitably mounted on the opposite side of carriage plate assembly 26 from the power roll 66 (FIGURE 9), and preferably is a 1/15 H.P., 1725 r.p.m. electric motor. The power roll 66 is usually made of soft rubber. The liner take-up jam roll 64, also made of rubber, is rotatably mounted on jam roll arm 90 which in turn is slideably mounted on the carriage plate assembly 26. Sliding movement of the jam roll 64 causes the liner 46 to be pinched between the power roll 66, the jam roll 64 and the liner take-up spool 62 when power is supplied by the motor 74 to roll 66. Pinching the liner causes the power roll 66 to pull liner 46 and strip it from the tape roll 42. When the liner is being stripped from the tape roll by means of the power roll 66, it angularly changes position between the tape roll 42 and the spool 60, whereupon applied tension to the liner will cause it to progressively bear downwardly against the leading edge 69 of switch arm 68, thereby shutting off microswitch 70 and shutting off electric power to motor 74 which, in turn, removes tension and associated pinching of liner 46 by jam roll 64. Removal of power from roll 66 relieves tension on the liner between rolls 64 and 66 whereupon power roll 66 mounted on the motor shaft 88 will merely coast to a stop without imparting any further tension to the liner and thereby avoid overstripping since the liner is not pulling roll 64 into a pinched jamming position. The liner, after having passed between jam roll 64 and the power roll 66, is permitted to drop freely into any convenient receptacle (not shown). It should be understood that the liner take-up assembly 32 is not affected in its operation by the decreasing diameter of the tape roll 42. As shown, the entire liner take-up assembly 32 and tape roll 42 are mounted on the longitudinally movable carriage plate assembly 26.

General Method of Positioning Insoles

As shown in FIGURES 3 and 6, either a right or left insole 30 is loaded by the operator on the horizontal plates 92 and 94 of deck assembly 20, between the fixed but adjustable heel guide assembly 22 and the movable toe guide assembly 24. The angular positioning members of the toe and heel guide assemblies with their included angles of 90° (45° on each side of the center line of the longitudinal slot 96) serve to position the insole upon contact with the edge portion at the four tangent points 97, 98, 99 and 100. The area common to right and left paired insoles, when they are so positioned, is shown in FIGURE 3 by the cross hatched area 23, and is described as follows: if any insole shape has an opposed or mirror image of its contoured outline superimposed thereon, an area 23 is formed common to both insole outlines within which adhesive material may be applied. The opposed image of said insole represents the mating member of the pair of right and left insoles. Regardless of the configuration or shape of the insole, there will be an area common to right and left insoles of sufficient length and width and within such area, pressure-sensitive adhesive tape may be applied.

Alignment of Insole Prior to Taping

*Heel guide adjustment.*—The operator adjusts the heel guide assembly 22 by moving it longitudinally backward or forward along the deck slot 96 locking the heel guide assembly at the graduated index 102 located on plate 92 corresponding to the length size of the insole 30. For example, if the insole 30 is size 8½, the operator would set the heel guide assembly 22 adjacent the point marked size "6–10" on index 102, locking the heel guide assembly screw member 104.

In loading, the insole is dropped by the operator on deck plates 92 and 94 so that the insole 30 will be located between the adjusted heel guide assembly 22 and the open, retracted, toe guide assembly 24. Accordingly, no precise positioning is required in loading the insole. This is particularly significant if the operator inadvertently reverses the direction of introduction of the insole into the machine. Conversely, this can be performed whenever desired without modifying the operation of the machine. For example, the insole may be turned around or rotated 180° and tape applied from the heel 31 to the toe 33 of the insole 30 without modification.

*Toe guide operation.*—When the insole 30 has been dropped between the toe guide assembly 24 and the heel guide assembly 22, the toe guide is held open by means of a toe guide cam 106 (FIGURES 9 and 10). When the crank arm has reached 330°, as indicated in FIGURE 2, the toe guide 24 begins to close against the insole toe 33, and the 90° included angle opening of the toe guide longitudinally positions the insole 30 on deck plates 92 and 94 in the direction of the heel guide assembly 22. The heel 31 of the insole 30 upon contacting the inside of the angle opening of the heel guide assembly 22 beneath the undercut recess 108 is deflected into abutting contact with the planar side portions 110, 111, 112 and 113 which define the angular openings of the toe guide 24 and heel guide 22, respectively, at the points 97—100 which are tangent to the peripheral curves of the insole edge at the point of contact.

The toe guide assembly 24 illustrated in FIGURE 10 contains a system of cords and weights, by means of which a weight 114, attached at the end of cord 116, serves to bias the toe guide assembly 24 toward heel guide assembly 22. Weights may be added or removed by the operator according to the thickness, flexibility or type of insole, so that when the toe guide 24 is pulled by the weights 114, it will move into contact with the insole toe 33 and exert a force sufficient to align the insole 30 between the toe guide assembly 24 and the heel guide assembly 22 without causing buckling or distortion of the insole. The toe guide 24 continues to close against insole 30, being pulled by the weights 114, until the insole has been displaced to a position of final alignment which will interrupt further movement of toe guide 24. Of course, a suitable spring could be substituted for the weights and cord to bias the toe guide assembly 24 toward the heel guide assembly 22. When toe guide cam 106 is rotated to a position where it permits the toe guide 24 to be drawn by the weights 114 into contact with the insole 30, the toe guide is released after the cam follower disengages contact with toe guide cam 106, coming to rest against the toe 33 of insole 30.

*Insole grips*

After the insole is aligned between the toe guide 24 and heel guide 22, the left and right grips 118 and 120 move downwardly and hold the insole 30 against plates 92 and 94, in the manner illustrated in FIGURES 1, 9 and 10. The grips 118 and 120 serve to retain the insole 30 in aligned position until immediately after tape 40 has been applied to the insole and severed. Each grip is separately actuated by a spring biased, cam-operated linkage mechanism 122 and 124, the details of which are illustrated in FIGURE 9.

*Tape Applying Mechanism*

Figure 12:
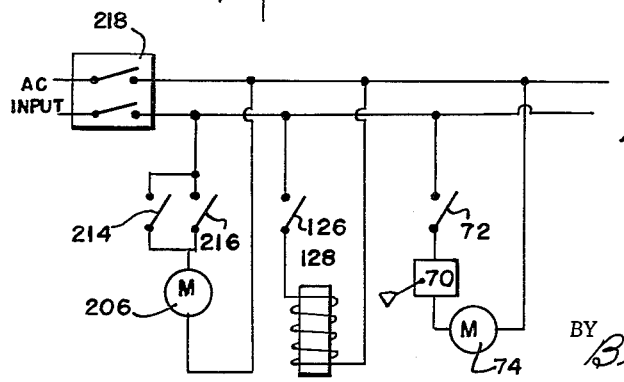
FIGURE 12 is a schematic wiring diagram illustrating the electrical circuit of the tape applying apparatus.

*Actuation.*—After the insole 30 has been loaded into the machine and it is desired to apply tape to the insole, the operator will actuate the trigger mechanism 21 by switch 126 (FIGURES 1 and 12). Opening the trigger switch 126 will de-energize the electrical solenoid 128 causing trigger arm 130 to drop, the same being biased downwardly by a suitable compression spring (not shown). In dropping, the arm 130 is directed by means of arm guide 132. Solenoid 128 is mounted on plate 134, which plate is secured to the structural framework 18 of the machine so as to be located in a suspended position over carriage plate 26.

Figure 8:
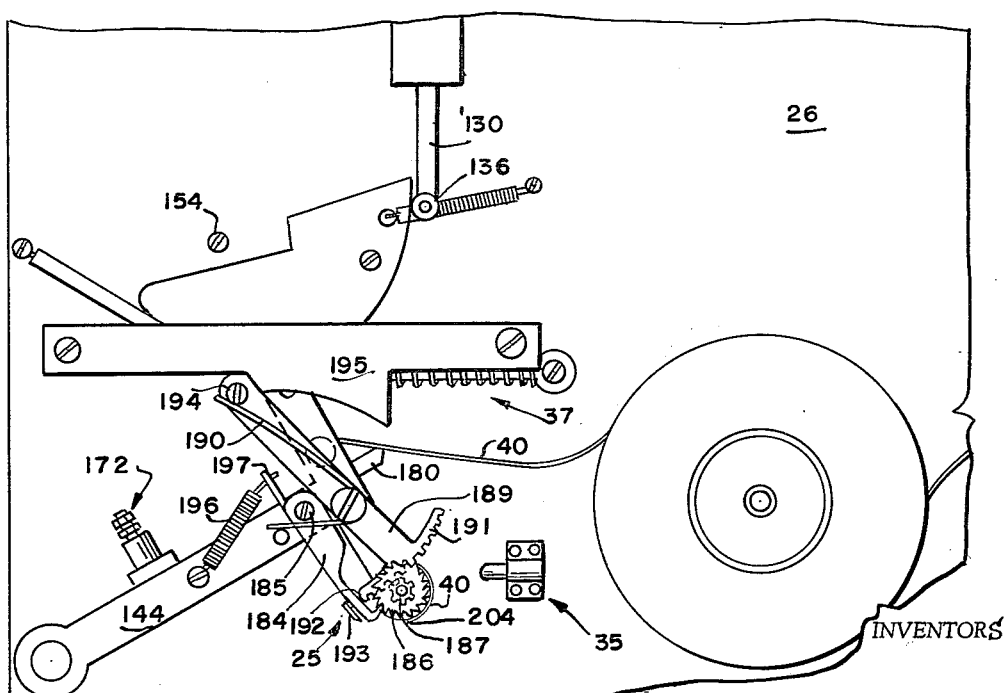
FIGURE 8 is a partial side elevational view of the tape applying assembly after returning to a raised remote position.

The follower roll 136 at the end of trigger arm 130 is then in a position to initiate or start the tape applying operation by engaging the approaching cam plate 138 in the manner illustrated in FIGURE 8, causing it to rotate counterclockwise about cam plate pivot 140 and press downwardly against the roller arm follower 142 located between the top of roller arms 144 and 146 as illustrated in FIGURE 1. When it is not desired to apply tape to an insole, trigger switch 126 is returned to the "off" position which will energize solenoid 128 retracting trigger arm 130 upwardly whereupon roll 136 cannot engage the roller arm cam plate 138. At the time the insole is aligned between the heel guide 22 and the toe guide assembly 24, the tape may be applied within area 23 as illustrated in FIGURE 3.

Figure 5:
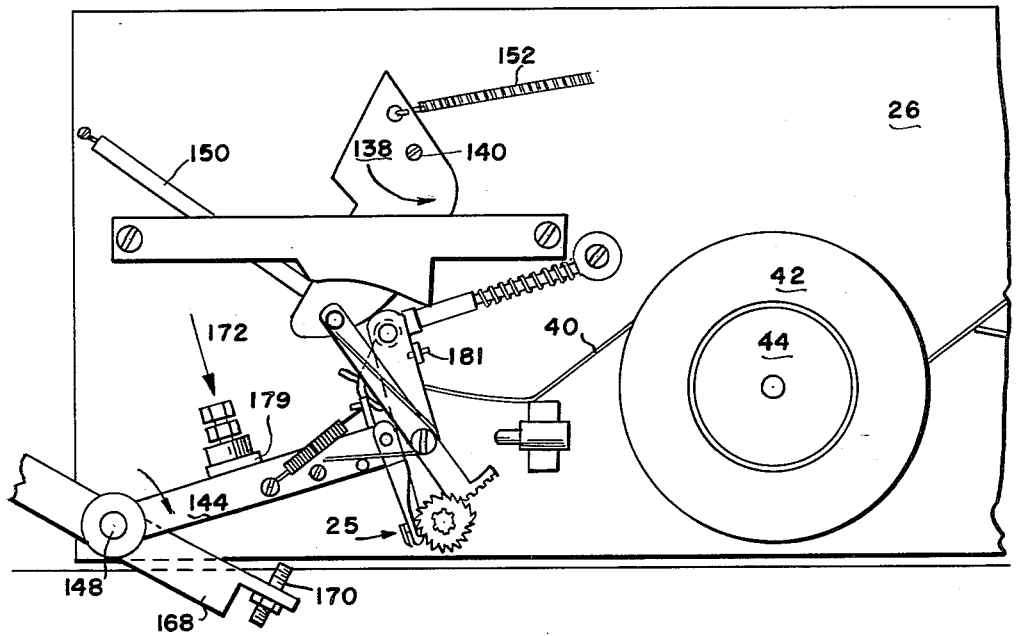
FIGURE 5 is a partial side elevation of a tape applying assembly shown descending from an upper remote position toward a lowered applying position.

Referring now to FIGURES 1 and 5, after the grips 118 and 120 have initially closed against the insole 30, the roller arm cam 138 and follower 142 push the roller arms 144 and 146 and their associated assemblies downwardly, rotating the arms 144 and 146 clockwise around pivot pin 148. Roller arm assembly counterbalance spring 150 is employed to reduce the shock and weight of the tape applying assembly 28 in its downward movement against the insole 30. Cam plate 138 is then pulled by spring 152 back against stop 154, as shown in FIGURE 1. The tape 40 which is threaded through the tape applying assembly 28 and terminates beneath the center of the applying roll 54, is pressed by the applying roll against the insole 30.

*Applying*

As the tape applying assembly 28 moves longitudinally forward toward the heel guide 22, the applying roll assembly 54 rotates and transfers the tape 40 to the insole 30, as more fully described hereinafter.

Movable carriage plate 26 mounted on plate rollers 156 disposed within channel 158 which in turn is fixed by the structural framework 18, reciprocates longitudinally back and forth over the table or deck assembly 20. Connecting rod assembly 29 and crank arm 160, as illustrated in FIGURE 1, cause plate 26 to reciprocate, and by varying the position of the crank arm pin 162 with respect to the center 164 of crank arm 160, the stroke length of the reciprocating motion of the carriage travel may be changed, thereby controlling the length of the strip of tape 40 that is applied to the insole 30. By adjusting or varying the position of connecting rod extension 166 with respect to connecting rod bar 168, which constitute part of connecting rod assembly 29, the relative position of the strip of tape with respect to the insole may be changed. The carriage 26 continues to move in a forward direction while tape is being applied to the insole as shown in FIGURES 6 and 6(a).

*Severing*

Figure 7:
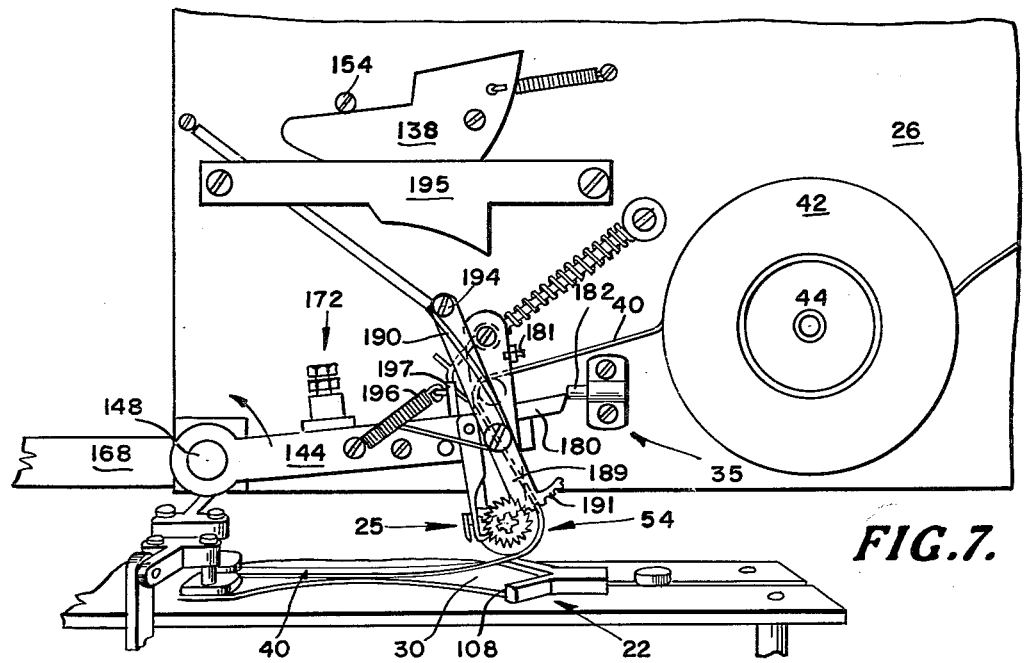
FIGURE 7 is a partial side elevational view of the tape applying assembly shown in a formardmost slightly raised position prior to severing of the tape.

When the carriage plate 26 containing the tape applying assembly 28 reaches a point, such that the crank arm 160 makes an angle of 180°, the applying roller assembly 54 is lifted upwards away from the insole, in the manner illustrated in FIGURE 7, by the connecting rod lift screw 170 mounted on the end of the connecting rod bar extension 168 (FIGURES 5, 6(a) and 7), contacting the roller arm lift spring mechanism 172. The plunger 176 which is biased, as shown in FIGURE 6(a), by means of spring 177 located in barrel 178 mounted on plate 179 between roller arms 144 and 146, causing the tape applying assembly 28 to rotate counterclockwise around pivot pin 148 in the manner illustrated in FIGURE 7.

As shown in FIGURE 7, when the roller arms 144 and 146 have moved upwardly such that a space of approximately ½" exists between the applying roller assembly 54 and the insole 30, the heel 31 of the insole is restrained from following the tape 40 upwardly by the undercut recess 108 of the heel guide 22. The power bar pawl arm 180 which is mounted on roller arms 144 and 146 will be tripped by contacting detent button 182 of the power bar trip assembly 35 which is mounted on carriage plate 26. In FIGURE 8, power bar pawl finger 184 which is mounted on shaft 185, as is also arm 180, will move away from, and thereby releases, the applying roll ratchet 186 so that the ratchet may turn. The ratchet 186 is fixed on applying roll shaft 187. Located between the ratchet 186 and the roller arm 144 is an applying roll gear 188, see FIGURES 1, 6(b) and 9. Power bar 189 is also mounted on the outside of roller arm 144 and is powered by the power bar spring 190. The power bar 189, by means of its toothed gear segment 191, causes applying roll gear 188 and therefore shaft 187 to rotate. Cutter arm 192 which carries cutter blade 193, is mounted on shaft 187 which, in turn, rotates, whereupon cutter blade 193 rotates counterclockwise and severs tape 40. The extent of the rotation of cutter blade 193 may be adjustably controlled by a power bar stop member 181 (FIGURE 5).

Cocking

Referring now to FIGURES 1 and 8, roller arms 144 and 146, being lifted by connecting rod bar assembly 29, continue to lift upwardly forcing power bar roller 194 against power bar cam 195 which pivotally turns power bar gear arm 189 counterclockwise and rotates the cutter blade 193, gear 188 and ratchet 186 clockwise until the cutter blade 193 is returned to cocked position at which time spring 196 connected to the upper leg 197 of the power bar pawl finger 184 causes the finger to engage ratchet 186 locking cutter arm 192 in cocked position.

Insole Releasing

Carriage plate 26 having reached the extent of its travel toward the forward end of the machine when crank arm 160 makes an angle of 180°, as indicated in FIGURE 2, the carriage then proceeds rearwardly. At approximately 195°–210° angle of crank arm 160, the right grip 120 and left grip 118, as shown in FIGURES 1 and 9, open and retract away from the insole 30. Toe guide 24 has previously opened, as indicated in FIGURE 2, between angles 60°–90° of crank arm 160. Between the angles 210°–270° of crank arm 160, the operator then unloads the insole 30 to which tape 40 has been applied and, between angles 270° and 330°, reloads the machine with another insole 30 to which tape is to be applied. The insole to which tape has been applied may then be stored until it is ready to be further processed.

Roller Arm Retention

Roller arms 144 and 146 have a spring loaded actuator assembly 37 which will hold the tape applying assembly 28, as well as the mechanisms mounted thereon, in the lifted remote position away from the insole 30. The spring actuator assembly 37 also serves to maintain a spring loaded pressure on the applying roll assembly 54 when the roller arms 144 and 146 are in the downward position and tape is being applied to the insole as illustrated in FIGURES 1 and 6.

Tape Lock

Referring now to FIGURES 6 and 6(a), as tape applying assembly 28 is raised upwardly at the end of the forward movement of carriage plate 26, the distance between roller 50 and the tape roll wheel 44 increases. This would ordinarily cause the tape 40 to be pulled backwardly, up and away from the applying roll assembly 54 as the roller arms 144 and 146 are raised upwardly. This reverse feeding or backlash of the tape 40, when roller arms 144 and 146 are raised upwardly, is prevented by a tape lock assembly which includes a pawl 52 with a sharp edge, or point, or series of points, pinching the tape 40 between roller 50 and pawl 52. The pawl 52 rests by gravity against roller 50, turning about pawl shaft 51.

Referring to FIGURE 6(b), the applying roll assembly 54 contains a central core 199 rotatably mounted on shaft 187. On the core 199 are mounted two cylinders 200 as well as a center disk 56. Inside the core 199 is an anti-backlash ball detent 201, biased by spring 202 against roller arm 144 to prevent the tension of the tape 40, when cut by cutter blade 193, from rotating the applying roll assembly 54 in a counterclockwise direction. In this way the cut end of the tape 40 will always remain beneath the central axis of the roll assembly. As the tape applying assembly 28 moves downwardly against the insole 30 it will press the terminal end 204 of the tape shown in FIGURE 8 against the insole.

Applying Roll

While any suitable type of material may be employed in constructing the applying roll assembly 54, and bearing in mind certain variable conditions that must be taken into consideration in transferring tape from a surface of contact possessing a value of adhesive bond less than that required to establish an adhesive bond with the insole, more fully described hereinafter, the applying roll utilized in the present invention comprises a pair of outer cylindrical rolls 200 of silicone rubber material having ground, rough peripherial surfaces separated by a central disk 56 composed of fiber or pure gum rubber. In this connection, it should be understood that the serrated silicone rubber cylindrical rolls 200 are desired since they serve to exert a bonding pressure on the strip of tape 40 without establishing an effective bond therewith during the time tape is being directly applied to the insole 30, whereas, the tape 40 will only adhere directly to the central disk 56 so that the terminal end 204 of the tape will be retained on the applying roll assembly 54 after severance through adherence to the central disk 56 in proper position to be subsequently transferred during the next applying cycle.

Power Drive

As shown in FIGURES 10 and 11, a suitable power source, such as motor 206 may be employed to drive the main shaft 208 through a variable reduction transmission 210. In turn, the main shaft 208, through suitable gear trains and chain drives, rotates shaft 210, upon which are mounted toe guide cam 106 and side-grip cams 212, as well as the crank-shaft 161 in which, in turn, imparts reciprocating movement to the carriage assembly 26 through the crank arm 160 and related connecting rod assembly 29. Main drive motor 206 may be intermittently operated by switch 214 or continuously operated by switch 216 after main switch 218 is actuated.

Tape Transfer

The tape 40 does not stick to the silicone rubber cylinders 200 making up the right and left sections of the applying roll assembly 54 but instead adheres only to the center disk 56. This is due to the chemical and physical characteristics of the silicone rubber cylinders. When the tape 40 is pressed between the applying roll assembly 54 and the insole 30 and the tape applying assembly 28 moves longitudinally forward rolling the tape on the insole, the tape is transferred directly to the insole 30 from the applying roll assembly 54.

For purposes of definition, the various terms used herein to describe the characteristics of the pressure-sensitive tape are in accordance with the standards specified by the Technical Commission of the Pressure Sensitive Tape Council, Glenview, Illinois, for "Test Methods for Pressure Sensitive Tapes" appearing in Bulletin STC–1, issued September 1955 and revised May 1959.

The resistance to normal and lateral forces, or a combination of these forces, on each side of the tape may be expressed as a function of the area of the tape, the tensile and shear adhesion values of the tape, and the empirical factor $k$:

$$R = A \times T \times k$$

wherein R is the resistance to normal and lateral forces on each side of the tape, tending to either separate or misalign the surfaces of contact to which the tape is applied, A is the area of the tape, T is the minimum value of the peel or shear adhesion and $k$ is an empirical constant which is based upon such items as: the age and temperature of the tape as well as the temperature, cleanliness and finish of the contacted surfaces, as more fully described in our Patent No. 3,052,904, referred to above.

When double-faced, pressure-sensitive adhesive tape contacts and adheres simultaneously to one or more surfaces on either one or both faces of the tape, which faces may possess different adhesive characteristics, and the surfaces of contact possess different areas, or effective net areas, of adhesion subject to different $k$ factors, then the adhesive tape will adhere ultimately to that area of contact which exhibits the greatest value of "R" when subjected to a force of separation, and the tape will progressively separate from each surface of contact, according to the ascending values of "R" exhibited by the respective contact areas.

It should be understood that the internal cohesive strength of the adhesive tape must be greater than the adhesive bonds developed between any face and any surface of contact, so that the tape will not delaminate. However, it should also be noted that other factors such as tension applied in stripping the tape from the roll, inertia, movement and the time necessary to develop full physical and/or chemical bond at each area of contact are not considered. As a result, it is possible to utilize both faces of the double-faced, pressure-sensitive tape to aid in directly transferring the tape from one surface of contact to another. Between a minimum value of "R" possessed by any free tape surface, and a maximum value of "R" which exists in an adhesive bond established between any face of the tape and an ultimate surface of contact, intermediate contacting surfaces may be introduced within this range of R values so long as the intermediate contacting surfaces progressively exhibit ascending values of R less than the maximum value of R.

In this apparatus the tape 40 will adhere to the center disk 56 of the applying disk assembly 54 when the tape applying assembly 28 is raised upwardly above the insole 30 because the center disk exhibits a higher value of "R" than the opposite free face of the tape which is not in surface contact and therefore does not develop a value of "R." In other words, since the free side of the tape lacks any area of contact, the value of "A" equals zero. Also, when the tape is pressed between applying roll assembly 54 and the insole 30 and the applying roll is moved along the top surface of the insole to develop the adhesive bond, the tape will adhere to the insole and separate from the applying roll disk 56 because the value of "R" exhibited between the surface of contact of the tape and insole is greater than the value of "R" exhibited by the surface of contact between the tape 40 and the applying roller assembly 54. In this manner if necessary or desirable, additional intermediate rollers to direct or to transfer, turn, apply and release, or any combination of these functions, may be interposed between the tape lock roll 50 and the insole provided that the value of "R" developed at each contact of the tape after leaving roll 50 and progressing to the insole is progressively of a higher value of "R." On the other hand, the tape will not develop any effective adhesive bond with the silicone cylinders 200 because this material possesses physical and chemical characteristics which exhibit no significant value of R.

It is to be understood that, although several preferred embodiments of the invention have been shown in the drawings and described with considerable particularity in the foregoing specification, the invention is not limited to the specific details of construction, shown and described, but includes all modifications coming within the scope of the appended claims and their equivalents.

What is claimed is:

1. In the manufacture of footwear, a method of applying double-faced, pressure-sensitive tape to an insole comprising the steps of (1) positioning said insole in fixed relation to receive and retain said tape on the surface of the insole within an area defined by the common outline formed by superimposing upon said insole an opposed image thereof, (2) applying said tape directly to the positioned insole within said area, (3) severing said tape at a predetermined length and (4) releasing the taped insole for subsequent application to a last.

2. In the manufacture of footwear, a method of applying double-faced, pressure-sensitive tape to an insole in the manner defined in claim 1 including the additional steps of stripping said tape from a roll having an interliner and removing said interliner on demand.

3. In the manufacture of footwear, a method of applying adhesive material in the form of tape to an insole comprising the steps of (1) positioning said insole to receive and retain said tape within an area defined by the common outline formed from superimposing upon a face of said insole an opposed image thereof, and (2) applying a length of said tape determined by the extent of said area directly to that portion of the insole face disposed within said area for subsequent application to a last.

4. In the manufacture of footwear, a method of applying double-faced, pressure-sensitive tape to the last contacting face of an insole comprising the steps of (1) positioning said insole to receive and retain said tape within an area defined by the common outline formed from superimposing upon the last contacting face of said insole an opposed image thereof, and (2) applying a length of said tape directly to that portion of the last contacting face disposed within said area by developing an adhesive bond between one face of said tape and said insole face which exceeds in magnitude an adhesive bond previously developed between the other face of said tape and a related surface of transfer.

5. In the manufacture of footwear, a method of applying double-faced, pressure-sensitive tape to an insole in the manner defined in claim 4, wherein the component of tape is transferred to the insole component by moving one of said components relative to the other during the applying step.

6. In the manufacture of footwear, a method of applying double-faced tape from a roll containing an interliner to an insole comprising the steps of (1) positioning said insole to receive and retain said tape within an area defined by the common outline formed from superimposing upon a face of said insole an opposed image thereof, (2) applying a length of said tape directly to the insole face disposed within said area, and (3) removing said interliner in response to the amount of tape being applied to said insole face by sensing the angular displacement of said interliner relative to the peripheral surface of said roll whereupon said interliner will be stripped from said roll in direct relation to the amount of tape being applied.

7. A method of stripping an interliner from a roll of tape in direct response to the amount of tape being removed from the roll comprising the steps of (1) sensing the angular displacement of said interliner relative to the peripheral surface of said roll during removal of tape therefrom and (2) stripping said interliner from said roll in direct response to the amount of tape being removed.

8. A method of transferring double-faced, pressure-sensitive adhesive material from a roll having a removable liner adhesively secured to one face thereof comprising the steps of (1) sensing the angular displacement of said liner relative to the peripheral surface of said roll during removal of adhesive material therefrom, (2) stripping said liner from said roll in direct relation to the amount of adhesive material being transferred, and (3) developing adhesive bonds of varying magnitude between the exposed faces of said adhesive material and successive surfaces of contact by progressively applying the adhesive material to that surface of contact which develops the lesser adhesive bond and transferring said adhesive material to that surface of contact which develops the greater adhesive bond.

References Cited in the file of this patent

UNITED STATES PATENTS

| | | |
|---|---|---|
| Re. 25,056 | Fritzinger | Oct. 17, 1961 |
| 921,635 | Thoma | May 11, 1909 |
| 1,365,221 | Blake | Jan. 11, 1921 |
| 2,532,011 | Dahlquist et al. | Nov. 28, 1950 |
| 2,652,166 | Johnson | Sept. 15, 1953 |
| 2,701,887 | Nolan | Feb. 15, 1955 |
| 2,984,847 | Maeser | May 23, 1961 |